United States Patent
Jha et al.

(10) Patent No.: US 12,515,331 B2
(45) Date of Patent: Jan. 6, 2026

(54) SYSTEM AND METHOD FOR ROBOTIC PLANNING IN PARTIALLY OBSERVABLE ENVIRONMENTS USING LARGE LANGUAGE MODELS

(71) Applicant: Mitsubishi Electric Research Laboratories, Inc., Cambridge, MA (US)

(72) Inventors: Devesh Jha, Cambridge, MA (US); Lingfeng Sun, Albany, CA (US); Chiori Hori, Cambridge, MA (US); Diego Romeres, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 50 days.

(21) Appl. No.: 18/660,517

(22) Filed: May 10, 2024

(65) Prior Publication Data
US 2025/0187184 A1 Jun. 12, 2025

Related U.S. Application Data

(60) Provisional application No. 63/607,440, filed on Dec. 7, 2023.

(51) Int. Cl.
*B25J 13/08* (2006.01)
*B25J 9/16* (2006.01)

(52) U.S. Cl.
CPC .............. *B25J 9/1658* (2013.01); *B25J 9/161* (2013.01); *B25J 9/1661* (2013.01); *B25J 13/084* (2013.01)

(58) Field of Classification Search
CPC . B25J 9/163; B25J 9/1661; B25J 9/161; B25J 19/02; G05B 13/04
See application file for complete search history.

(56) References Cited

U.S. PATENT DOCUMENTS 11,833,691 B2 * 12/2023 Hajash .................. B25J 9/1607
2021/0086364 A1 * 3/2021 Handa .................... G06V 20/56
(Continued)

OTHER PUBLICATIONS

Vemprala et al., ChatGPT for Robotics: Design Principles and Model Abilities, Scaled Foundations, Microsoft, Jul. 21, 2023. p. 1-25. https://arxiv.org/pdf/2306.17582.pdf.

(Continued)

*Primary Examiner* — Dalena Tran
(74) *Attorney, Agent, or Firm* — Gene Vinokur

(57) ABSTRACT

A controller is provided for manipulating objects by a robot arm having a gripper. The controller includes a large language model (LLM) planner configured to acquire the states and the task description and generate an action sequence command that operates the robot arm with the gripper based on the task description, the current observations, historical information including historical actions and historical observations from previous steps. The controller includes a robot interface configured to generate and transmit commands to operate the robot arm in response to the action sequence from the LLM planner and an LLM evaluator configured to acquire the states, the current observations, analyze the historical information including historical actions and historical observations from previous steps, evaluate missing information required to complete the task, evaluate new information acquired by the sensors, estimate a task-execution status after the robot arm operated the generated action sequence, and output updated information to the LLM planner.

20 Claims, 9 Drawing Sheets

(56) References Cited

U.S. PATENT DOCUMENTS

2022/0226995 A1* 7/2022 Beck ................... B25J 9/1641
2024/0025039 A1* 1/2024 Adelson ............... B25J 9/1612
2024/0033916 A1* 2/2024 Sykes .................. B25J 9/1661

OTHER PUBLICATIONS

Ahn et al., Do As I Can, Not As I Say: Grounding Language in Robotic Affordances, Robotics at Google, Everyday Robots, p. 1-34. https://arxiv.org/pdf/2204.01691.pdf.
Liang et al. Code as Policies: Language Model Programs for Embodied Control, Robotics at Google, pp. 1-16, https://arxiv.org/pdf/2209.07753.pdf.

* cited by examiner

401 [Environment*]
A Franka robot is placed in front of a table with cubes on top...

402 [Task Description*]
Move the heavier blocks to the corner of the table.

403
1) PICK <object>
2) PLACE <location>
3) RESET

404 [Output Examples**]
EXPLAIN To check the weight of blocks, we need to first...
PICK blockA\n PLACE [0.1 0.2 0.05 0 0 1]

405 [History and Current Observation*]
Round 1: block A at... force reading... after action PICK...
Current: block A at ..., force reading...

406 [Output Instructions and Rules**]
Think step by step...
Remember to follow the format of output...

\* same for evaluator  \*\* adjust for evaluator

FIG. 4

SYSTEM AND METHOD FOR ROBOTIC PLANNING IN PARTIALLY OBSERVABLE ENVIRONMENTS USING LARGE LANGUAGE MODELS

TECHNICAL FIELD

This invention relates generally to robotic manipulation and more particularly to methods for interactive planning in partially observable environments using large language models.

BACKGROUND

Designing robotic agents to perform open vocabulary tasks has been the long-standing goal in robotics and AI. Recently, Large Language Models (LLMs) have achieved impressive results in creating robotic agents for performing open vocabulary tasks. However, planning for these tasks in the presence of uncertainties is challenging as it requires chain-of-thought reasoning, aggregating information from the environment, updating state estimates, and generating actions based on the updated state estimates. This disclosure is related to an interactive planning technique for partially observable tasks using LLMs. In the proposed method, an LLM is used to collect missing information from the environment using a robot and infer the state of the underlying problem from collected observations while guiding the robot to perform the required actions.

LLMs have shown to be quite capable to automate robot planning for a lot of tasks which can potentially simplify deployment of robots by making them easier to program. Furthermore, LLMs have been shown to be very effective in allowing robots to perform open vocabulary tasks. However, most of the open vocabulary tasks that have been solved using LLMs are open-loop planning problems with perfect description of the environment as well as the task. In these tasks, the task horizon is generally small (i.e., they are generally a single-step planning tasks), and the reasoning involved is quite simplistic. However, a lot of open vocabulary tasks have incomplete description of the environment which cannot be simply solved by designing a suitable reward function or designing suitable parameters for parametric skills. For example, suppose that there is a robot butler cleaning a home. And there are multiple bottles in the refrigerator. If the task is to pick the bottle on the left and put it on the counter, the task is fully described, and it can be solved easily as the object to be moved is fully specified. However, if the task is to pick up the empty bottle and throw it in the trash bin, the task cannot be solved without first collecting additional information. Unlike the previous task, the robot does not have the information about the empty bottle and thus, it needs to first identify the empty bottle and then plan to pick it up. Prior techniques of using LLM for robotic planning can not be used for these tasks as these tasks involve interactive planning where LLMs should identify missing information, collect missing information using the robot and then plan the robot actions to complete the task.

Thus, there is a requirement for a framework using LLMs which can be used for generating plans and reasoning about data collected using onboard sensors in partially observable environments.

SUMMARY OF THE INVENTION

One of the objectives of the present disclosure is to provide a system and method to perform robotic tasks in partially observable environments where the task requires collecting data from the environment, updating task state estimate using the collected data, and then, finally performing tasking actions to complete the task using the updates task state.

Some embodiments of the proposed disclosure are based on the realization that designing robotic agents to perform open vocabulary tasks has been the long-standing goal in robotics and AI. One of embodiments is based on recognition that Large Language Models (LLMs) have achieved impressive results in creating robotic agents for performing open vocabulary tasks. However, planning for these tasks in the presence of uncertainties is challenging as it requires chain-of-thought reasoning, aggregating information from the environment using sensors, updating state estimates, and generating actions based on the updated state estimates.

This disclosure presents an interactive planning technique for partially observable tasks using LLMs. In the proposed method, an LLM is used to collect missing information from the environment using a robot, and infer the state of the underlying problem from collected observations while guiding the robot to perform the required actions.

Some embodiments of this disclosure are based on the understanding that a lot of robotic tasks are partially observable or have missing information. While such tasks are very easy for humans to perform, performing such tasks are still difficult for robots. These tasks tend to have a long planning horizon, require chain-of-thought reasoning, data collection, state update rule using the collected data and action selection based on the updated state.

Some embodiments of this disclosure are based on the realization that the current LLM planners are not capable to reason and plan about partially observable complex tasks. This could be attributed to a lot of reasons but mainly because the current LLM planners can not perform long horizon chain of thought reasoning, which is required for planning in these environments. Consequently, the current disclosure proposes to decompose the task of LLM into planning and evaluating the partial observability of the task.

Some embodiments of the current disclosure are based on the realization that an LLM evaluator can assist an LLM planner by reasoning about missing information and what kind of information needs to be collected and update the task state for performing the given task. This can help simplify the chain of thought reasoning task for the LLM planner and thus, it can then plan the optimal action given the input from the LLM evaluator.

According to some embodiments of the present disclosure, a controller is provided for manipulating objects by a robot arm having a gripper. The controller includes a sensor interface configured to generate and transmit states and current observations acquired by sensors; an interface circuit configured to receive the states and the current observations from the sensor interface and a task description provided by a user; a large language model (LLM) planner configured to acquire the states and the task description and generate an action sequence command that operates the robot arm with the gripper based on the task description, the current observations, historical information including historical actions and historical observations from previous steps, wherein the LLM planner reasons about uncertainty of completion of the task due to incomplete information based on the current observations, wherein the LLM planner transmits the generated action sequence command to the robot arm; a robot interface configured to generate and transmit commands to operate the robot arm in response to the action sequence from the LLM planner; and an LLM evaluator configured to acquire the states, the current observations, analyze the historical information including historical actions and historical observations from previous steps, evaluate missing information required to complete the task, evaluate new information acquired by the sensors, estimate a task-execution status after the robot arm operated the generated action sequence, and output updated information to the LLM planner.

Further, some embodiments of the present disclosure provide a non-transitory computer-readable storage medium having stored thereon executable instructions. As a result of being executed by one or more processors, the executable instructions cause a control system to perform steps of: generating and transmitting states and current observations acquired by sensors; receiving the states and the current observations from the sensors and a task description provided by a user; acquiring, using a large language model (LLM) planner, the states and the task description and generate an action sequence command that operates the robot arm with the gripper based on the task description, the current observations, historical information including historical actions and historical observations from previous steps, wherein the LLM planner reasons about uncertainty of completion of the task description based on the current observations, wherein the LLM planner transmits the generated action sequence command to the robot arm; a robot interface configured to generate and transmit commands to operate the robot arm in response to the action sequence from the LLM planner; and acquiring, using an LLM evaluator, the states, the current observations, analyze the historical information, evaluate missing information for the task description, evaluate new information acquired by the sensors, estimate a task-execution status after the robot arm operated the generated action sequence, and output updated information to the LLM planner.

BRIEF DESCRIPTION OF DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

FIG. 4 shows an example of the template of prompts provided to the large language model (LLM) for performing the robotic tasks considered in this disclosure;

DETAILED DESCRIPTION

In the following description, for purposes of explanation, numerous specific details are set forth to provide a thorough understanding of the present disclosure. It will be apparent, however, to one skilled in the art that the present disclosure may be practiced without these specific details. In other instances, apparatuses and methods are shown in block diagram form only to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Designing robots that have the physical intelligence to perform open vocabulary tasks is extremely challenging. This requires that robots be able to interpret tasks from an open set of instructions and execute them robustly while performing the required reasoning. One can argue that this could be the most challenging problem facing artificial intelligence (AI). However, designing such agents can truly revolutionize the way robots would be integrated into our future society. Recently, large language models (LLMs) have been shown to be very impressive at solving tasks of different complexities. Large language models can help understand the tasks and decompose them into a sequence of actions, reward functions, or goals for policy given appropriate prompts and training data. Motivated by these developments, we present a problem of interactive planning in uncertain environments where a robot may not have complete information to perform the task. In these tasks, the robot needs to interact with its environment and collect additional information to complete the task.

Figure 1:
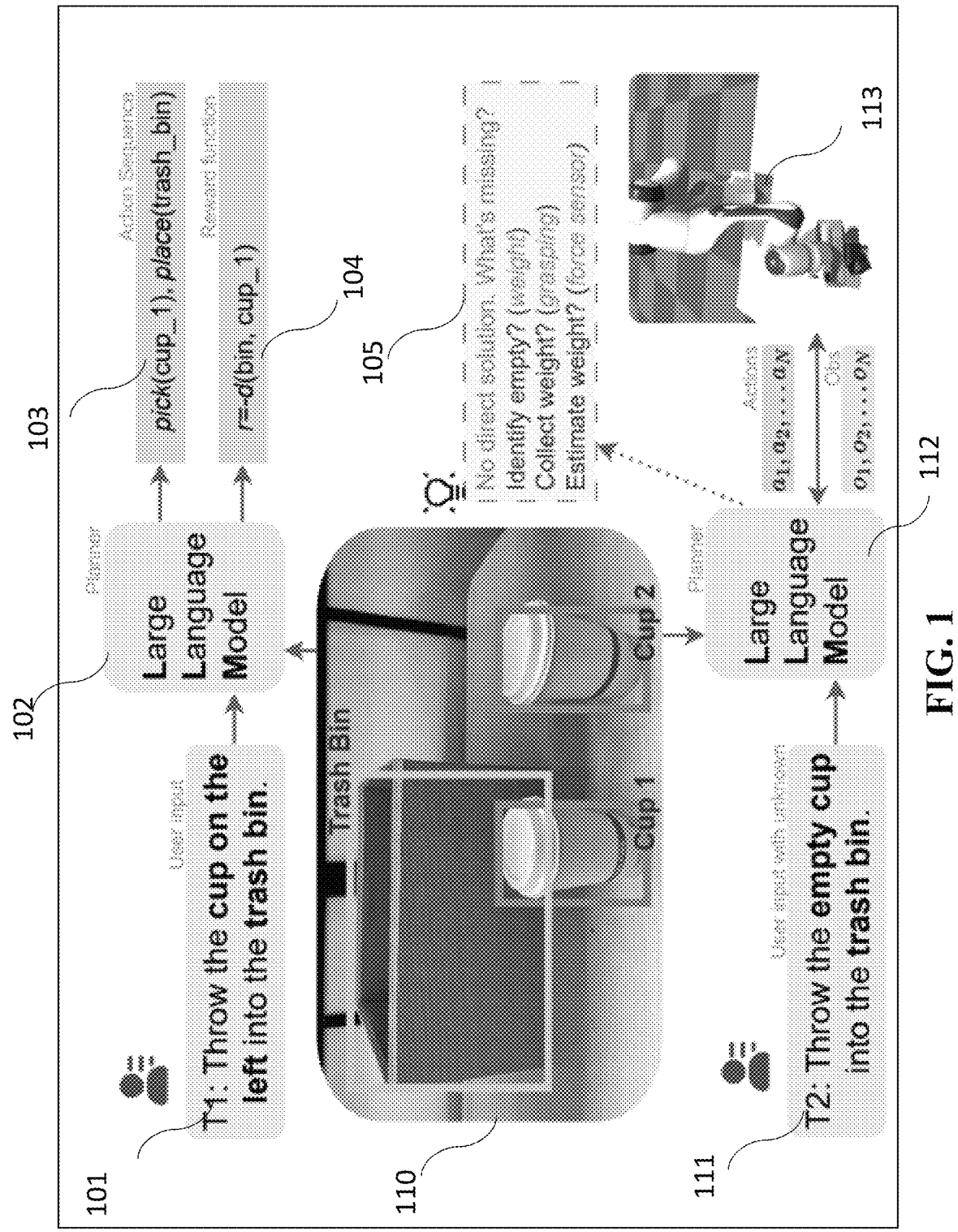
FIG. 1 shows a schematic of an example task which is partially observable and can not be solved by existing methods using large language models (LLMs)

Some embodiments of the current disclosure are based on the understanding that a lot of robotic tasks are often ambiguous due to partial observability or uncertainty. While LLMs have been shown to be quite capable of designing robotic agents with perfect information, they have not been shown to be able to plan for situations where the robot might need to collect additional information before it could perform the task. For example, FIG. 1 shows an example task where uncertainty is present in the content of the cups. The disclosed invention presents a method to solve partially observable tasks using LLMs by interactively collecting information. For task T1 101, a user provides a task prompt to throw the cup on the left into the trash bin. Since this task is fully specified without any ambiguity, an LLM agent 102 can generate feasible action sequences 103 to finish the task. In this case, an interface circuit including a microphone and a speech recognition system (not shown) are arranged to connect to the LLM agents 102 and 112 and configured to generate and provide the task description from task words spoken by the user to the LLM agents 102 and 112. Alternatively, the LLM agent 102 can generate a feasible reward function 104 to train a policy to perform the task.

For task T2 111, a user provides a task prompt to throw the empty cup into the trash bin. For this task, the LLM agent 112 does not have the information about which of the two cups is empty, and thus the LLM 112 cannot find a direct solution 105. The solution to this task is to find an interactive plan to collect the missing information and then generate actions to perform the desired task.

To perform task T2 111 (task description), the agent needs to reason about whether all the information is present to perform the task, what information is missing, how to gather additional information, how to update the task state and decide the action plan based on the new collected information. It is quite clear that it would be very difficult to design a suitable reward function to train a reinforcement learning policy to perform such tasks.

Partial observability and uncertainty are the norm, rather than the exception, in the real world. For example, consider task T2 111 shown in FIG. 1, where a robot needs to understand how it can gather information to identify the empty cup and then throw it in the bin. Unlike the tasks with complete information, it would be challenging to design a sequence of skills or a suitable reward function that can solve this task. This problem can be formulated as a Partially Observable Markov Decision Process (POMDP). However, solving POMDPs could be computationally intractable. It requires reasoning in the belief state of the problem and does not scale well with the dimensionality of the problem.

Some embodiments of the current disclosure are based on the realization that prior work on using LLMs for robotic tasks has demonstrated good reasoning capability of LLMs as well as mapping of the reasoning to robot actions. Inspired by these advancements, we believe that we can leverage the reasoning and chain-of-thoughts (CoT) capability of LLMs to solve partially observable tasks while interacting with the environment. What makes this challenging for current LLMs is the requirement to understand what the missing information is, how the robot can collect that missing information, update the task using new observations and then, use them for task planning.

Some of the embodiments of the current disclosure are based on the realization that most of the prior works using LLMs in robotics focus on step-wise scene and task understanding making full use of the current available modalities to infer the optimal action and/or reward. This disclosure presents an interactive planning technique under cases of partial observability using LLMs. This requires planning to aggregate information from the environment, reasoning about the correct state of the system, and updating the state estimates based on the sensor observations collected by the robot.

Some embodiments of the current disclosure are based on the realization that the partial observable tasks tend to be multi-steps tasks requiring chain of thought reasoning. However, LLMs as planners for robotic tasks may encounter hallucination while planning for long horizon tasks requiring multi-step reasoning. To circumvent this problem, the current disclosure proposes to make use of two different LLMs—one is assigned the task of evaluating the current state of the task and the other one is assigned the task to plan feasible plans for the robot. This reduces the complexity of the task to be performed by each component and thus allows better reasoning of the individual subtasks.

Some embodiments of the current disclosure are based on the realization that a partially observable task could be modeled as a partially observable Markov decision process or a POMDP. A POMDP is an extension of a traditional Markov Decision Process (MDP) that tackles decision-making scenarios where the agent lacks complete state information. A POMDP is defined by a tuple $(S,A,P,R,\Omega,O)$, with $\Omega$ as the observation set and O as the observation function. At each time step, the environment (environment state) is in state $s \in S$. The agent takes action $a \in A$ and causes the environment to transit to s' accordingly to the transition function $P(s'|s,a)$, and $R(s, a) \in \mathcal{R}$ is the reward function indicating the (immediate) expected utility of executing a in s. At the same time step, the agent gets an observation $o \in \Omega$ which depends on the current state of the environment $O(o|s')$. Unlike the policy function in MDP $\pi(a|s)$, which maps the underlying states to the actions, POMDP's policy $\pi(a|b)$ is a mapping from the belief states b to the actions. The belief state b is a probabilistic estimation of the full state s. The updated belief state b' (updated information) after observing o is described by: $b'(s')=C \cdot O(o|s')\Sigma\_(s \in S)$ $P(s'|s, a)$ where C is a normalizing constant.

We also want the proposed framework to be generalizable to a variety of tasks. For different tasks $\tau$, the information required to make decisions can differ. This adds additional complexity since now the LLM has to reason about a generalizable state space S. In the open-vocabulary robotics task scenarios, the robot observations are determined by on-board sensors (sensors or multiple modalities). For instance, the on-board sensors may be force sensors, torque sensors or tactile sensors connected to a robot arm including actuators to operate thereof, and imaging sensors including depth cameras. Further, some imaging sensors may be arranged separately from the robot (arm) and an object such that the imaging sensors acquire observations for the robot arm (or manipulating part) and the object being handled with the robot arm and the LLM understands the observations. Not all information about the environment is relevant to the task; some of them can be directly extracted from observations, while some are unknown and require exploration. Thus, we end up getting task-dependent belief state $b^\tau$, and the task-related states $s^\tau$ for task $\tau$. Both finding the necessary state abstraction for different tasks and finding the optimal policy $\pi$ under the task-specific MDP is important in this task-dependent POMDP setting.

Some embodiments of the current disclosure are based on the realization that uncertainty in decision-making in the tasks we test mainly arises from two aspects—environmental uncertainty and skill execution uncertainty.

The environmental uncertainties arise in the POMDP settings due to the agent's lack of complete environmental knowledge. For example, physical properties of the objects that cannot be directly observed. The uncertainties in the belief b can be reduced with certain observations.

Some embodiments of the current disclosure are based on the realization that even with a well-defined plan, the actual execution of actions on robots might not always lead to the expected outcome. This can be mainly attributed to the difference between the transition functions P, P_real of the designed and real system as well as unexpected disturbances during execution.

Some embodiments of the current disclosure are based on the realization that in order to solve the robotic task in the presence of partial observability, the LLM needs to solve the task of state abstraction as well as policy planning for the robotic task. Given the environment description and sensor observations, LLM needs to analyze the available information and abstract the sufficient statistics (or the appropriate state) to solve the task. Furthermore, it needs to reason about what is uncertain based on the current observations. It needs to update its belief based on the observations when prompted with historical information.

Some embodiments of the current disclosure are based on the realization that given the observation and action space, LLM needs to plan actions that gather environmental information to mitigate the uncertainty and update the agent's belief state. The LLM-based policy is also expected to generate the optimal plan to maximize the reward based on the task description with minimal steps. Also, since we use open-loop parameterized skills for the robot, the LLM is also used to provide feedback to the robot in cases of failure in execution of these skills. This feedback needs to be provided in a way that is still executable by the robot.

We use LLM to reason about these problems during task execution. It is noted that actions in the POMDP setting is conditioned on new observations and updated beliefs. There are a few additional challenges when using LLM as closed-loop policy for tasks with uncertainties that we consider in the paper. To update the belief state of the task, the LLM must understand the robot observations from different modalities (pose detections, force sensors, etc.).

Some embodiments of the current disclosure are based on the realization that the data formats might be new to the LLM model and thus, must be properly included in the prompt template to the LLM. Furthermore, the skills available to the robot are parameterized by continuous position and orientation coordinates which might be challenging to reason about while performing robotic tasks. Similarly, the output of the language model needs to be executable by the robot; the response should be written in a template that the downstream controller can understand.

Some embodiments of the current disclosure are based on the realization that the language-based policy in the proposed framework has multiple tasks to do in the planning loop. At each step, the input to the language model contains the task description from a user, the current observation from the robot, and the historical actions and observation sequence from previous steps. The model output includes an executable sequence of actions and the corresponding text explanation. The robot will execute the actions provided by the policy output and return the observations for a next-round query of the LLM. The language model must finish the reasoning task and output the policies in the designed format. The task description is the only user-provided input during the planning process.

Some embodiments of the current disclosure are based on the realization that the effectiveness of using LLMs as interactive planners relies on its strong chain-of-thought reasoning and in-context learning capability. Therefore, the prompt (input of a single round LLM query) to the LLM requires careful design to ensure it can generalize to robotics tasks and avoid hallucination (generating actions in wrong formats or not executable for the robot) in responses.

Figure 2:
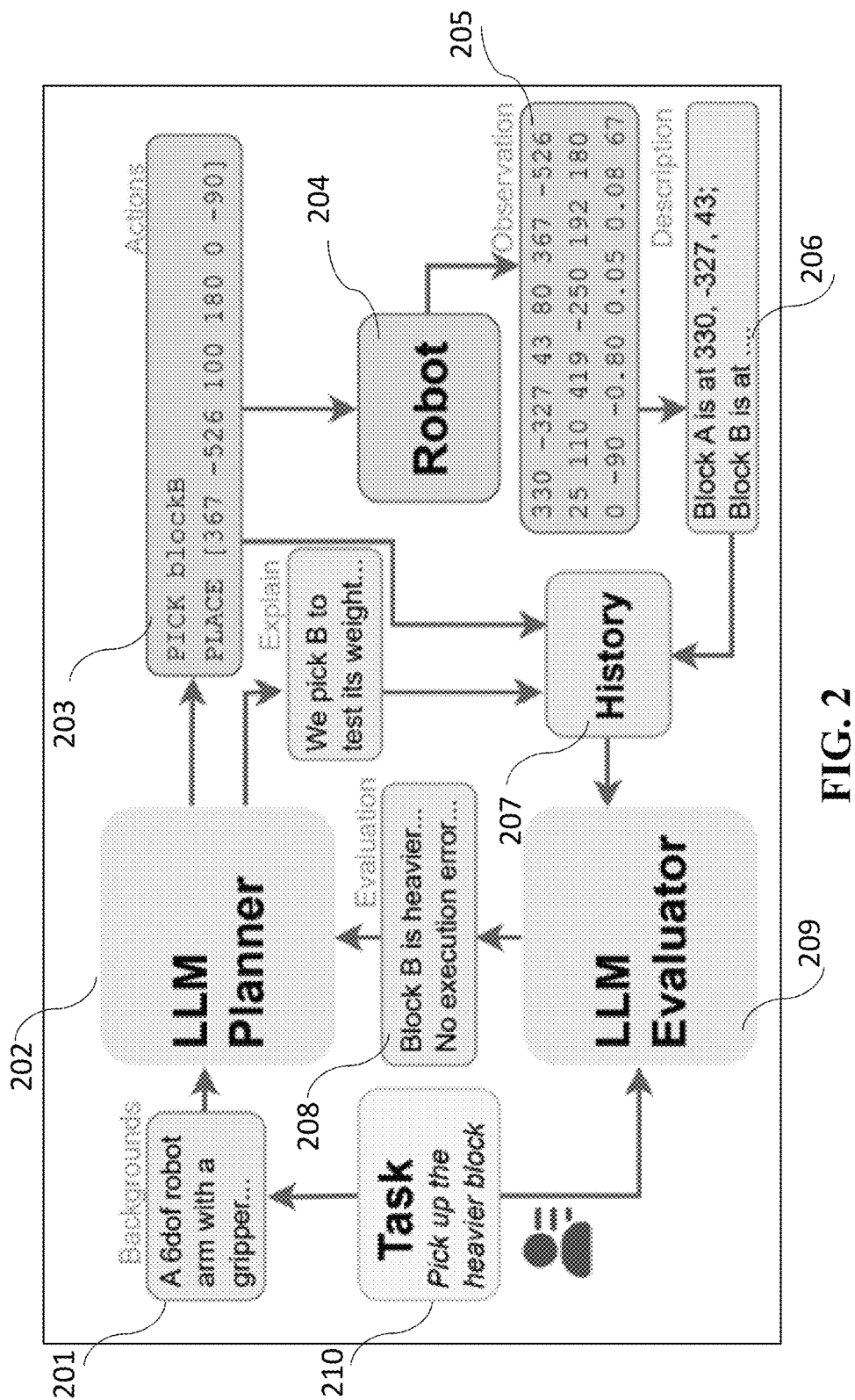
FIG. 2 shows a schematic of the framework proposed in the disclosure for interactive planning in tasks with incomplete information or partial observation.

FIG. 2 shows a schematic of the framework proposed in this disclosure for interactive planning of the partially observable tasks described in the disclosure. The user provides the task description through a prompt 210 asking the robot to pick up the heavier block. As described earlier, the task description is ambiguous as the user has not provided the information of which is the heaviest block. Thus, the LLM planner 202 can not come up with a direct plan to perform the task. However, this disclosure presents a framework consisting of two different LLMs 202 and 209 which perform different tasks to reason about the task. The LLM planner 202 is provided a description of the background of the robotic task 201.

The background description 201 contains the scene description in text. The background description 201 could also make use of a large image captioning model which can receive an image of the environment of the robot and can output a text description of the scene. The background description 201 contains information regarding the environment of the robot with the information of the objects present in the scene of the robot. The LLM planner 202 outputs the robot 204 actions based on the background and the task information provided by the user. The robot action output from the LLM planner is also added to the history which is provided to the LLM evaluator 209. The robot actions 203 output by the LLM planner 202 is provided to the robot 204. The LLM planner 202 also outputs an explanation of the plan which is also added to the history block 207. The robot 204 then performs the actions planned by LLM planner 202. The corresponding observations 205 and its description 206 is added to the history block 207. The LLM evaluator is also provided the background information 201 as well as the history block 207. The LLM evaluator 209 outputs an evaluation of the task based on the task prompt, the background description, and the history. This evaluation is then added as an input to the LLM planner 202. Thus, the current disclosure proposes a closed-loop interactive reasoning and planning framework to perform tasks with partial observation.

Figure 3A:
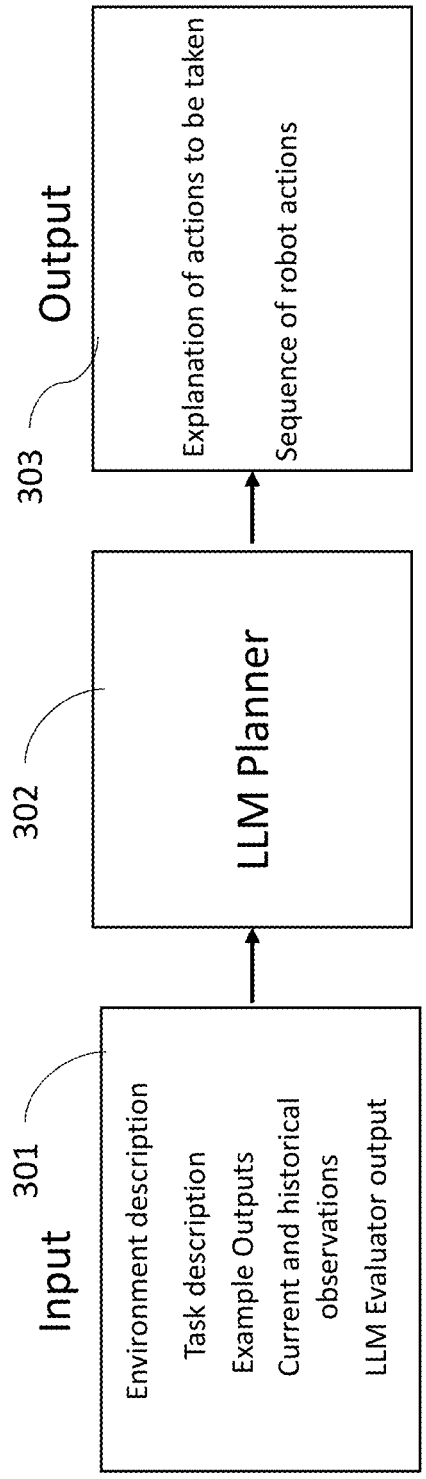
FIG. 3A shows the input and output for the LLM planner module proposed in this invention.

Some embodiments of this disclosure are based on the realization that LLM predictions for plan and the task estimate are based on the input and the prompts to the LLM. FIG. 3A shows the block diagrams for the input and output for the LLM planner. The input 301 to the LLM planner 302 consists of the environment description, the task description, example outputs, the current and historical observations as well as the output from the LLM evaluator. The output 303 of the LLM planner 302 consists of the explanation of the actions taken as well as the sequence of robot actions.

Figure 3B:
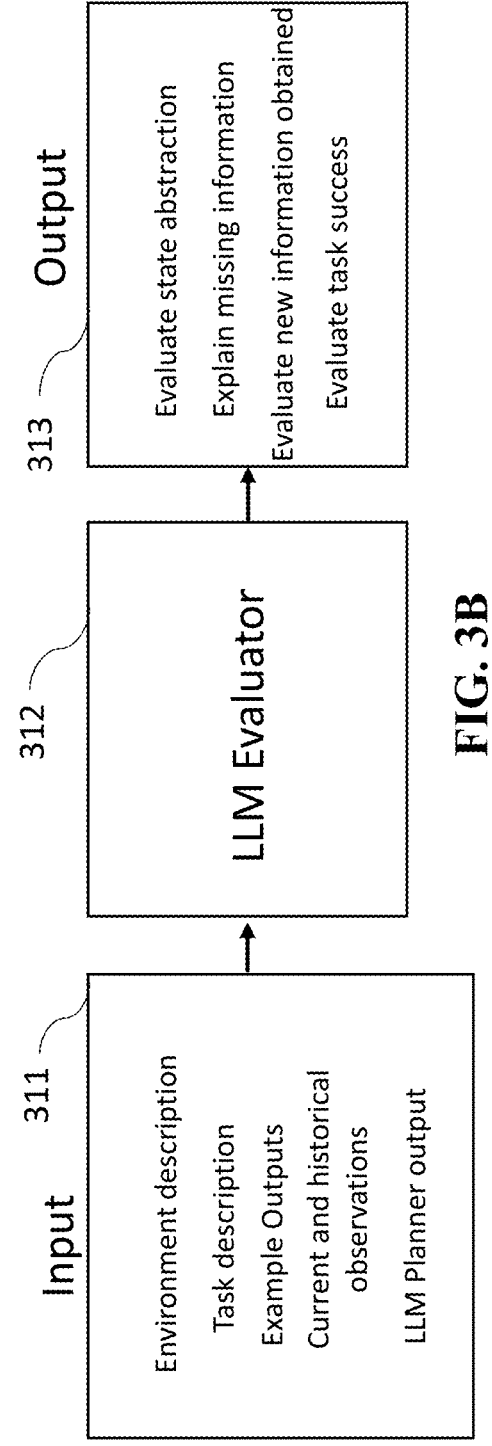
FIG. 3B shows the input and output for the LLM evaluator module proposed in this invention.
Figure 3C:
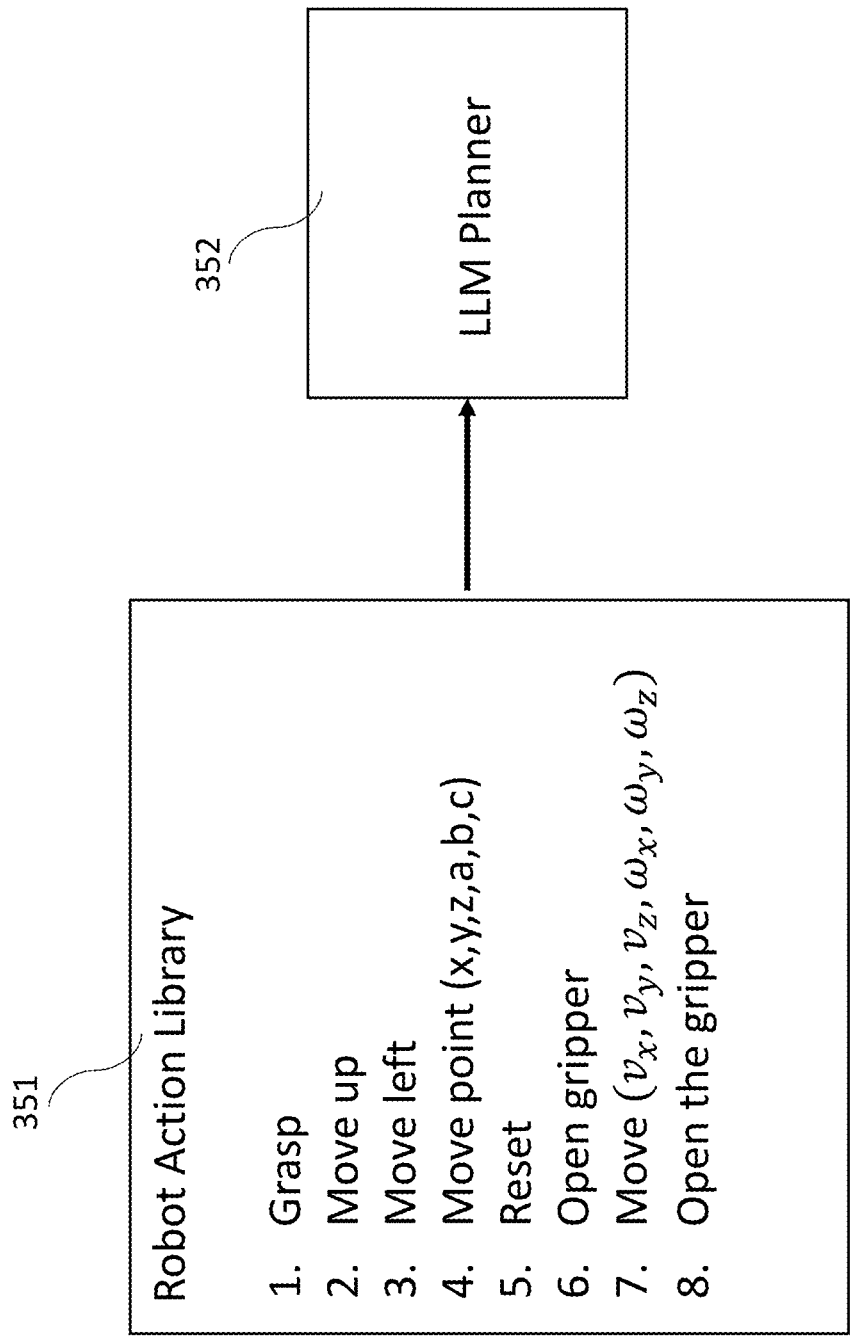
FIG. 3C shows the library of robot actions that is available to the LLM planner (and the evaluator) as described in the disclosure.

FIG. 3B shows the block diagrams for the input and the output for the LLM evaluator. The input 311 to the LLM evaluator 312 consists of the environment description, task description, example outputs, current and past observations as well as the output from the LLM planner 302. The output 313 from the LLM evaluator 312 consists of the evaluation of the state abstraction, explain the missing information, evaluate the new information as well as evaluate the task success. Further, FIG. 3C shows the library of robot actions (a robot action library) that is available to the LLM planner (and the evaluator) as described in the disclosure.

Some embodiments of the current disclosure are based on the realization that the quality of the plans suggested by a LLM planner depends on the details and quality of the prompts provided for plan generation. The prompts provided to the LLM planner could also contain a template about how the plans should be generated for the robot action as well as other instructions to help guide the plans generated by the LLM planner. FIG. 4 shows an example of the template of prompts provided to the large language model (LLM) for performing the robotic tasks considered in this disclosure. The input block contains a task description which consists of texts describing tasks from users.

The input 400 to the LLM planner consists of several blocks which are shown in FIG. 4. It contains detailed information regarding the environment description 401 where the kind of robot, the objects in the robot's environment, etc. are described. This also provides the robot the pose of all the objects present in the environment of the robot. The input block 400 also contains information about the task description 402. Background information that help understand the task settings. This information is preset by the user and is constant throughout planning for different tasks.

The input also provides the LLM the list of possible actions 403 available to the robot. The input block 400 also contains an example of the output expectation 404 from the LLM planner. Example outputs serve as in-context examples for planning. The LLM planner is also expected to explain the plan as part of the output 404. The input block 400 also contains the historical as well as current observations 405. The input block 400 also contains a list of instructions and rules for the LLM planner. The list of instructions helps reduce infeasible outputs from the LLM planner.

Some embodiments are based on the realization that the explanation in output, together with the action sequence (action sequence command), will be included in historical information. This helps the LLM to understand the past actions it has performed and avoid reasoning about it again. Note that the LLM planner needs to specify the parameters in the actions based on its own understanding of the environment, task, and the action space description. For manipulation tasks, this includes location and orientation for the target pose.

The LLM is also provided the library of robot actions 351 that the robot can perform. These actions could be low level robot actions such as the motor torques or it could be high level actions 351 such as grasp, move to a point, etc. These are available during planning to the LLM planner 352 as well as the LLM evaluator 312.

The same input format is maintained for the LLM evaluator that also uses the same library of robot actions for evaluation of plans during the interactive planning procedure described in this disclosure. The evaluator also takes in the background information, task description, and history observations after executing past actions. It evaluates the task-execution status and appends it to next-round prompting. The evaluator here will explicitly ask the LLM to finish the "state abstraction" (analyze what's the missing information), "belief update" in policy (analyze information from historical observations), and "correct execution errors" (identify failures from the history). Although it is possible to put all the requirements into the LLM planner, asking it to do all the analysis and make planning decisions in the response, we find decomposing this into two steps improves the reasoning results.

Figure 8:
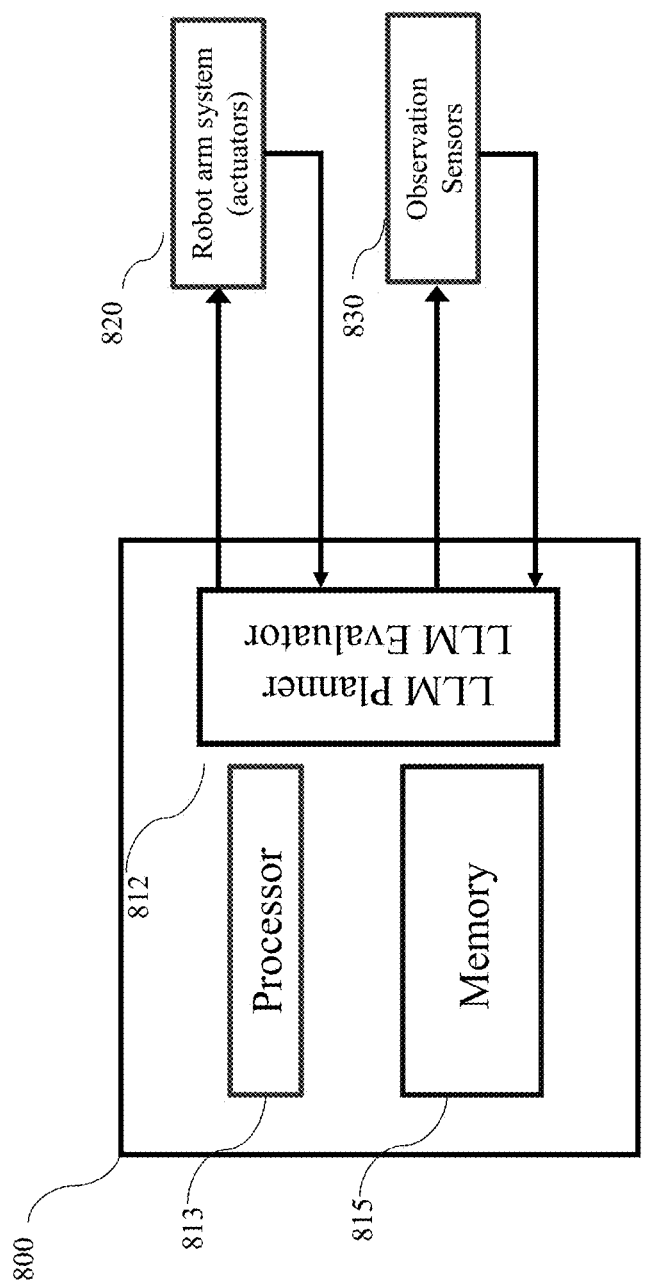
FIG. 8 shows a system-level schematic of the system where a robotic system is controlled by a LLM controller which consists of an LLM planner and LLM evaluator.

FIG. 8 shows a system-level schematic of some embodiments of the current disclosure. The system consists of a robot arm 820 and various kinds of sensors 830 to collect observations. These sensors can include force sensors, torque sensors, tactile sensors as well as image sensors including depth cameras. The robot arm and the sensors communicate and are controlled by the LLM planner and evaluator module 812 on the controller block 800. The controller block is also configured to have a processor 813 as well as required memory 815.

Some embodiments of the current disclosure are based on the realization that fine-tuning a language model, rather than directly querying a very large and capable LLM, not only enables offline deployment but also holds distinct advantages in the context of interactive planning. One prominent reason is the incorporation of multi-modality in the data. The proposed system does not solely rely on text descriptions but also utilizes the robot's observations. While these observations can theoretically be converted into text form, they constitute a novel data type that the closed LLMs has not been trained on, thereby resulting in limited zero-shot generalizability. For example, in experiments using some very capable LLMs, if poses in robot observations and action parameters are in different frames of reference, the LLM will have trouble transforming them. A second reason is the requirement of large contexts in the input. A direct query to a closed LLM would necessitate the inclusion of environment settings and generation constraints at each instance, which is inefficient and cost-intensive.

Some embodiments of the current disclosure are based on the realization that the extremely large and capable LLMs could be used for generating in-context data which can be used to fine-tune the smaller LLMs. However, generating data for finetuning the smaller models for interactive, partially observable robotic tasks is challenging as it also requires integrating realistic robot observations as part of the data which could be challenging for even the large LLMs.

Some embodiments of the disclosure are based on the realization that the difficulty of fine-tuning a smaller pre-trained LLM model mainly comes from two sides: 1) Lack of data for complex tasks. Most robotics data in the wild has no partial observable tasks involved, and force-torque sensor data is usually not included since they are noisy and vary across robots. 2) Smaller models are worse at reasoning tasks, CoT is fundamentally tied with larger models.

Figure 5:
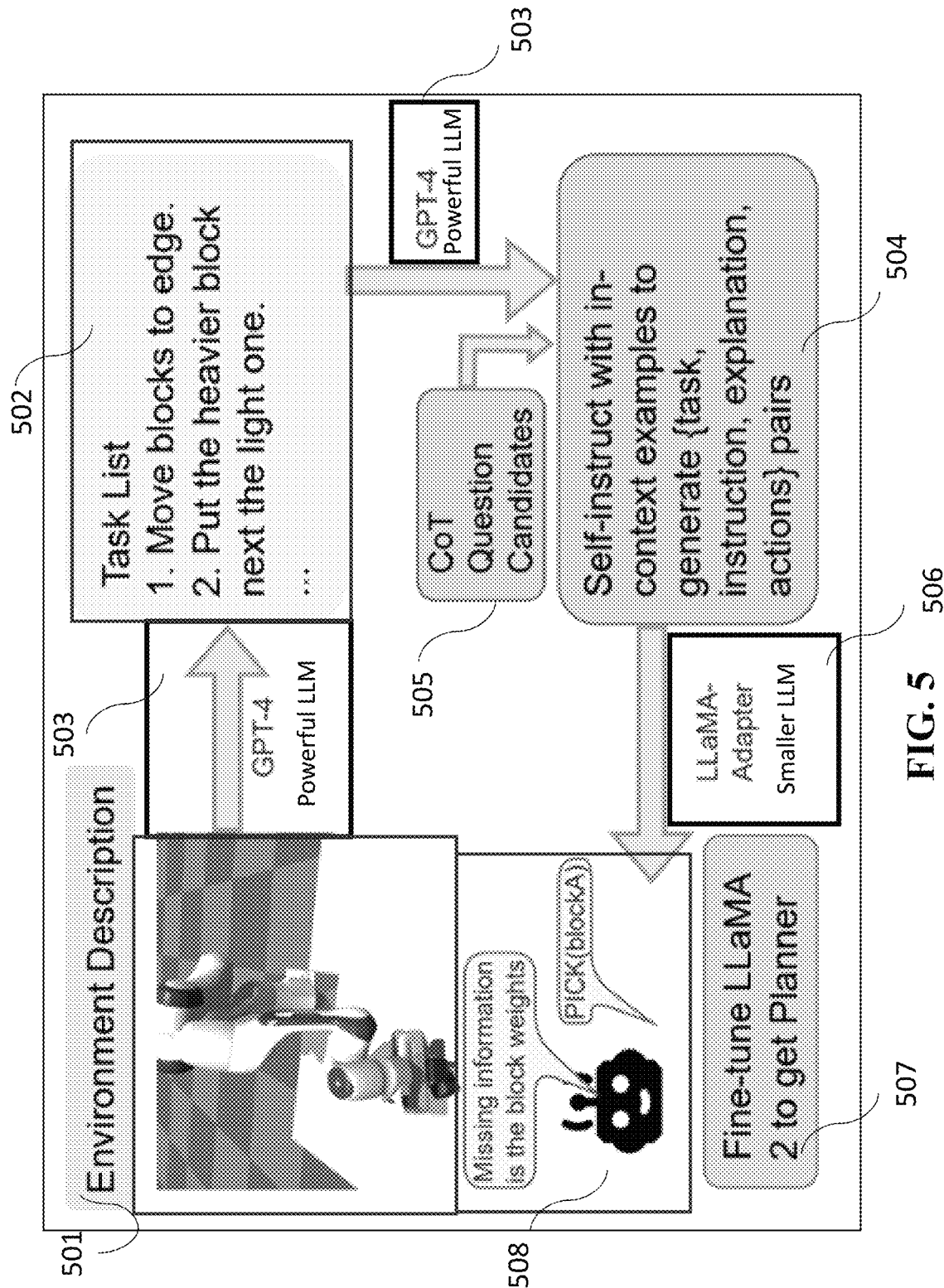
FIG. 5 shows an example of the template used to generate data to train a smaller large language model for robotic tasks described in this disclosure.

FIG. 5 shows an example of the template used to generate data to train a smaller large language model for robotic tasks described in this disclosure.

In order to get the required data to fine-tune a model as a planner in interactive planning under partial observation, we follow the procedure shown in FIG. 5. Using self-instruct 504 to generate an instruction dataset and fine-tune a smaller LLM model 507. In FIG. 5, we show and use GPT-4 as the powerful LLM and LLaMA as the smaller model but the approach is not limited to these models and could be applied to any model.

Some embodiments are based on the realization that the smaller LLM need diverse set of tasks 502 for achieve generalized reasoning capability. The task description consists of the 501 description of the environment, robot, potential uncertainties, action options. Example tasks are provided to a large and capable LLM 503 to generate a few tasks that are feasible to solve. We encourage the LLM to make the task set 502 diverse in difficulty.

The training process also requires instruction generation as part of the training data for in-context fine-tuning 507. The generated tasks are used to generate pairs of instructions and responses, following the self-instruct paradigm. The instruction includes task descriptions and questions, the input encompasses the robot's observations. The output generated by the model includes the same verbal explanations and actions as large LLM planners. We add format instructions to guarantee the "response" format.

Some embodiments of the disclosure are based on the realization that one of the key things for solving interactive planning tasks is the chain of thought (CoT) reasoning capability of the smaller LLMs. The CoT question designs 505 consists of finishing the state abstraction, belief update, and action planning in one query is hard for smaller models. Therefore, the proposed fine-tuning method creates CoT questions to ask if missing information exists, how to collect information, and how to solve the task with fill information. The planner will choose questions to ask based on binary options in response.

Furthermore, the fine-tuning data consists of integrating collected robot observations. For the pre-trained actions, the proposed method collects success trajectories of the robot finish the actions and use them as in-context reference examples in the Instruction Generation process.

Some embodiments are based on the realization that during inference, questions come from the pre-defined CoT question set, inputs come from robot observation.

Figure 6:
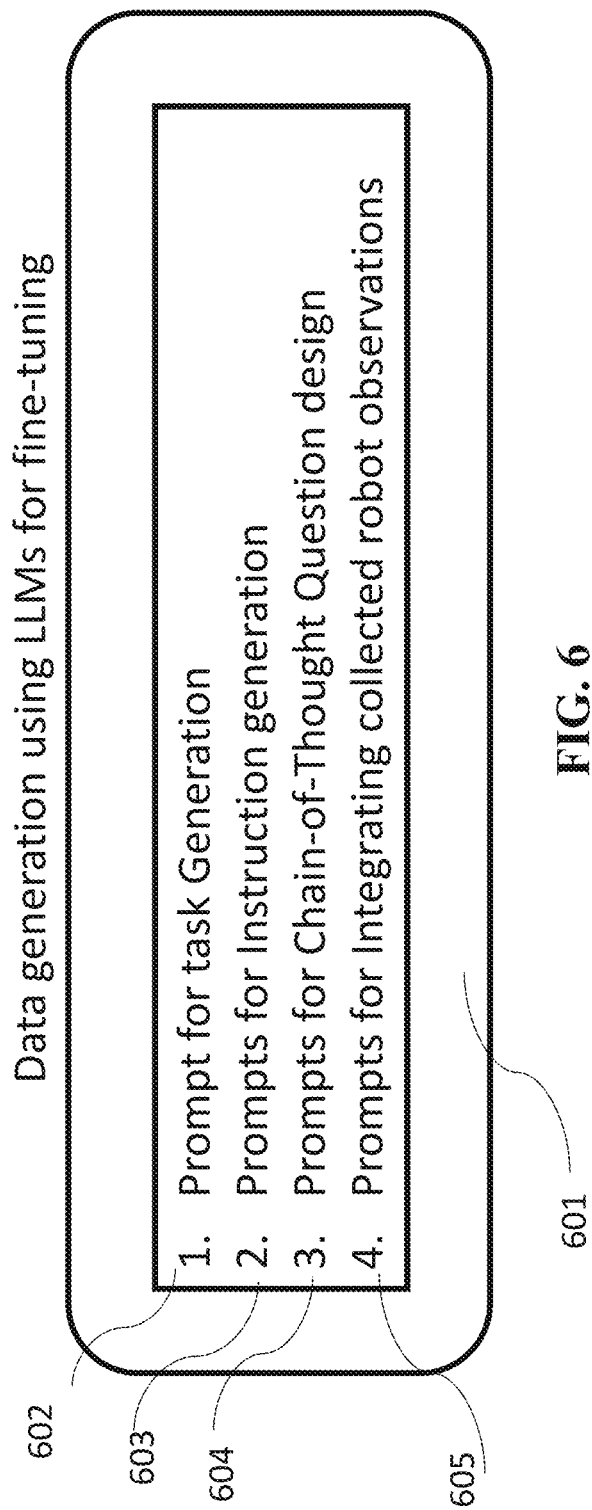
FIG. 6 shows an example of different prompts for data generation process using the large LLM for fine-tuning the smaller LLM.

FIG. 6 shows the different prompts for data generation process using the large LLM for fine-tuning the smaller LLM. As shown in the figure, the data consists of prompts for task generation 602, instruction generation 603, prompts for CoT question design 604 and for integrating collected robot observations 605.

Figure 7:
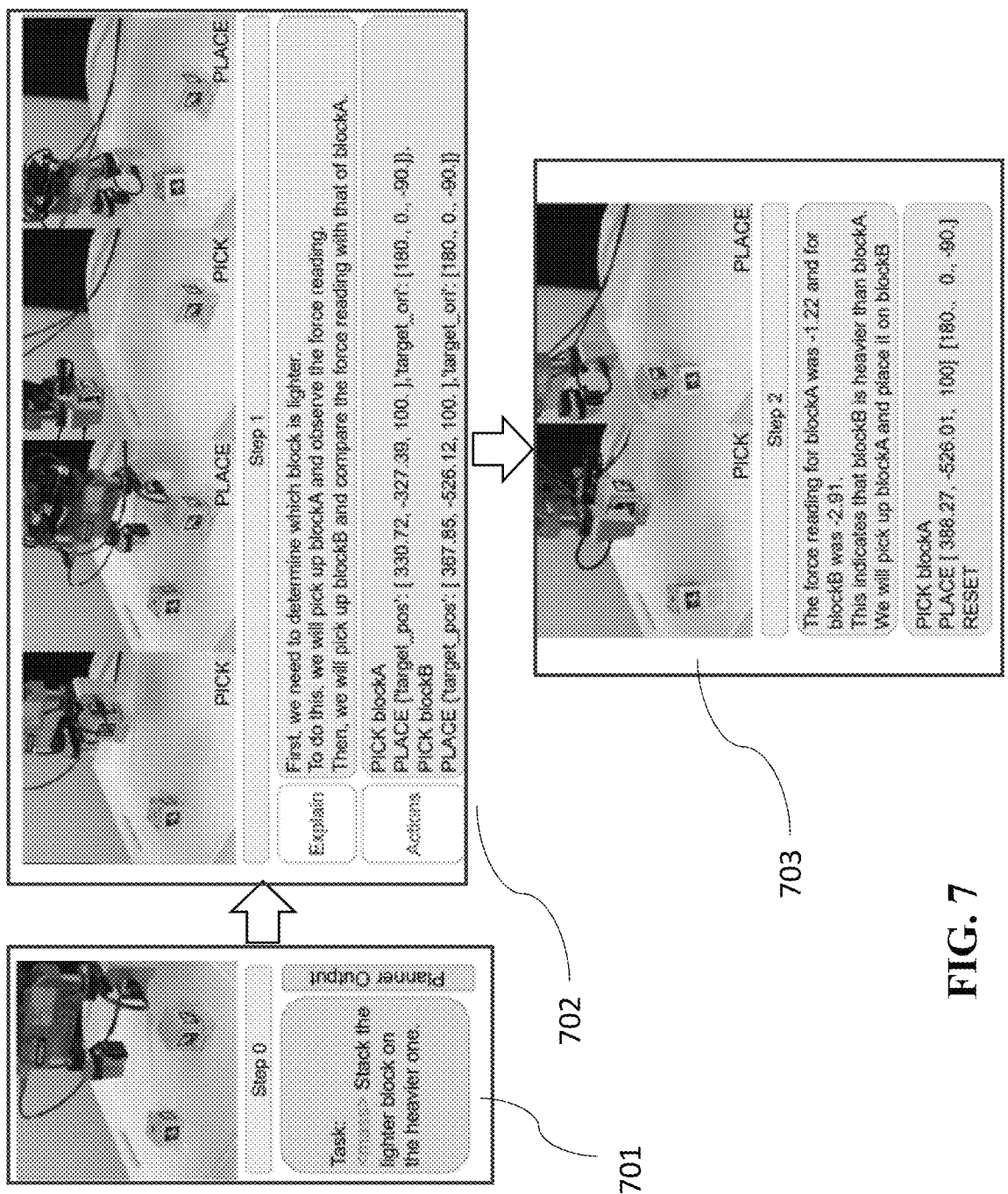
FIG. 7 shows an example of interactive task execution for a robotic system using the proposed framework using Large Language Models (LLMs)

FIG. 7 shows an example implementation of the proposed method on a robotic system for the following task description (instruction) 701: Stack the lighter block on the heavier one. In the first step 702, the LLM planner figured out the plan to determine which block is lighter by picking and placing up and placing down both blocks. In the second step 703, the LLM evaluator figured out blockB is heavier and plans to place blockA on blockB. In the next round (not shown in the figure), the evaluator recognized the completion of the task.

In the following, the examples of prompts for an evaluator (GPT-4 evaluator), a planner (GPT-4 planner), task generation, and instruction generation (CoT) instruction generation are listed in Tables 1, 2, 3, and 4. Although the examples for the prompts are shown in the tables, similar contexts of the prompts are possible and thus the format or style of the sentences/phrases for the prompts are not limited to those of the examples.

TABLE 1

Round 0 evaluator prompt for task: <mass> Stack the lighter block on the heavier block.
[Environment Context]
A Franka Panda robot is placed in front of a table with cubes on top. The robot is equipped
with a parallel gripper that can be used to pick and place the cubes.
There is a force sensor on the end effector. The force sensor reading unit is Newton,
gravity direction is -Z axis.
Observations include the pose of the robot's end effector, the pose of the cubes, and the
force readings. The positions of cubes are the center of mass position. The cube size is
0.05x0.05x0.05(m). The end effector with quaternion [1 0 0 0] is the
pose of a finger pointing down to the ground. Note that the cube axis is different from the
the end effector axis.
Quaternion [0 0 0 1] is the normal pose of the cube without rotation. The gripper is fully
closed with joint angles [0.04, 0.04] and fully open with joint joint angles [0.00, 0.00].
If there is a <mass> tag in the task description, the cubes are randomized to be different
weights. If there's a <movable> tag in the task description, the cubes are randomized
to be fixed or movable. In the default setting, blocks are movable and have the same weight.
[Task Description]
<mass> Stack the lighter block on the heavier block.
[History] None.
Based on the [Task description], [History], please first evaluate if the robot has successfully
completed the task.
If the task is not finished, please explain:
   Is there any missing information to solve the task? If [History] is included, also explain
   From the [History], what is the new task-related information we get? Show which action
   and observation you analyze the info from.
3. Are there any failed actions (observation after the action is not as expected)? Recognize
the action failure and suggestions to change the action. Action failures usually happen when
the plan does not leave enough clearance between the objects.
The response includes two lines: the first line is the boolean evaluation, the second line is the
reason for the evaluation and the analysis based on the [Current Observation] and [History].
Example:
SUCCESS
The robot has successfully completed the task.
FAIL
Task is not finished. The robot needs to pick up cubeA and place it on top of cubeB.
FAIL
Based on history the action PLACE failed. A potential solution is to change the target
position to a higher position.
Round 0 evaluator response.
FAIL
The task is not finished. Missing information to solve the task: the weight of the cubes.
Round 1 evaluator response.
FAIL
Task is not finished. Based on the force sensor readings in Action 0 and Action 2, cubeA is
top of cubeB. The robot needs to pick up cubeA and place it on top of cubeB.

TABLE 2

Round 1 planner prompt for task: <mass> Stack the lighter block on the heavier block
[Environment Context]
A Franka Panda robot is placed in front of a table with cubes on top. The robot is equipped
with a parallel gripper that can be used to pick and place the cubes. There is a force sensor on
the end effector. The force sensor reading unit is Newton, gravity direction is -Z axis.
Observations include the pose of the robot's end effector, the pose of the cubes, and the force
readings. The positions of cubes are the center of mass position. The cube size is
0.05 × 0.05 × 0.05(m). The end effector with quaternion [1 0 0 0] is the pose of a finger pointing
down to the ground. Note that the cube axis is different from the end effector axis.
Quaternion [0 0 0 1] is the normal pose of the cube without rotation. The gripper is fully
closed with joint angles [0.04, 0.04] and fully open with joint angles [0.00, 0.00].
If there is a <mass> tag in the task description, the cubes are randomized to be different
weights. If there's a <movable> tag in the task description, the cubes are randomized to be
fixed or movable. In the default setting, blocks are movable and have the same weight.
[Task Description]
<mass> Stack the lighter block on the heavier block.
[Action Options]
REACH <location> // end effector move to a desired pose
2) PICK <object> // pick up(reach and grasp) an object
3) PLACE <location> // place the grasped object to a location
4) RESET // reset the end effector to the initial position
5) WAIT // do nothing when you need to stay still for a while
<location> is a 7D vector, first 3 dimension position, following 4d quat orientation. For
REACH, <location> is the desired end effector pose. For PLACE, <location> is the desired
pose of the end effector (not the object) to release the object. For PICK <object> should be
cubeA or cubeB. PICK includes a REACH action before grasping the object. No need to
include REACH before PICK. PLACE should follow a PICK action. PLACE is needed after
PICK if there's another PICK in the following actions. This is important for safety. Always
note that the end effector pose is different from the object pose, and PLACE is the pose of the
end effector with [1 0 0 0] quaternion pointing down.
[Output Instruction]
The output has two components: explanation and action sequence.
Explanation start with EXPLAIN, then give words to explain your plan. For action sequence,
you must first output EXECUTE, then give a sequence of actions and put each on a new line.
Don't include extra explanations. Put exactly the single action on each line. Only include the
action you are confident the robot should execute. Don't include the action if there are
multiple choices and you are not certain. Plan it in the future with feedback.
[Output Examples (Not exactly for this task)]
EXPLAIN
To move cubeA to the left of cubeB, pick up cubeA, and place it to the left of cubeB.
EXECUTE
ACTION PICK cubeA
ACTION PLACE [0. 0. 1.10 1 0 0 0]
ACTION RESET
[History]
== Round 0 ==
[Response History]
Plan explanation: First, I will pick up cubeA and lift it slightly to check its weight. Then, I
will pick up cubeB and lift it slightly to check its weight. After comparing the weights, I will
stack the lighter block on top of the heavier block.
Action 0: PICK cubeA
Observation after step 0: CubeA: [0.11 0.13 1.20 0.01 0.00 0.39 0.92] CubeB: [0.18 −0.03
1.05 −0.00 0.00 −0.12 0.99] EEF: [0.10 0.13 1.20 0.93 0.37 −0.01 −0.00] Force: [1.17 −3.34
−3.95] Gripper: [0.02 0.02]
Action 1: PLACE [0.10 0.13 1.10 100 0]
Observation after step 1: CubeA: [0.12 0.13 1.05 −0.00 0.00 0.16 0.99] CubeB: [0.18 −0.03
1.05 −0.00 0.00 −0.12 0.99] EEF: [0.10 0.13 1.30 1.00 0.00 0.00 −0.00] Force: [−0.01 −0.00
0.01] Gripper: [0.04 0.04]
Action 2: RESET Observation after step 2: CubeA: [0.12 0.13 1.05 −0.00 0.00 0.16 0.99]
CubeB: [0.18 −0.03 1.05 −0.00 0.00 −0.12 0.99] EEF: [0.00 0.00 1.20 1.00 −0.00 −0.00 0.00]
Force: [0.13 −0.57 −0.55] Gripper: [0.04 0.04]
Action 3: PICK cubeB Observation after step 3: CubeA: [0.12 0.13 1.05 −0.00 0.00 0.16 0.99]
CubeB: [0.18 −0.04 1.20 −0.00 0.00 −0.11 0.99] EEF: [0.18 −0.04 1.19 0.79 0.61 −0.01 −0.01]
Force: [1.85 −5.00 −5.00] Gripper: [0.02 0.02]
Action 4: PLACE [0.18 −0.03 1.10 1 0 0 0] Observation after step 4: CubeA: [0.12 0.13 1.05
−0.00 0.00 0.16 0.99] CubeB: [0.17 −0.03 1.05 −0.00 0.00 −0.67 0.74] EEF: [0.18 −0.03 1.30 1.00
0.00 0.00 −0.00] Force: [−0.01 0.00 0.00] Gripper: [0.04 0.04] Action 5: RESET Observation
after step 5: CubeA: [0.12 0.13 1.05 −0.00 0.00 0.16 0.99] CubeB: [0.17 −0.03 1.05 −0.00 0.00
−0.67 0.74] EEF: [0.00 −0.00 1.20 1.00 0.00 −0.00 0.00] Force: [0.24 0.27 −0.89] Gripper: [0.04
0.04]
== Current Round ==
[Current Observation description] Table surface center is at (0.00 0.00), Table surface size is
(0.8 0.8) Cube A is at (0.12 0.13 1.05), with orientation (−0.00 0.00 0.16 0.99), Cube B is at
(0.17 −0.03 1.05), with orientation (−0.00 0.00 −0.67 0.74), Robot State: End effector is at (0.00
−0.00 1.20), with orientation (1.00 0.00 −0.00 0.00), End effector hand force reading is (0.24
0.27 −0.89), Gripper position is 0.04, 0.04,
[History and task evaluation] Task is not finished. Based on the force readings in Action 0
and Action 3, cubeA is lighter than cubeB. The robot needs to pick up cubeA and place it on
top of cubeB.

TABLE 2-continued

Based on [History and task evaluation], and current observation, plan for the robot to collect information and solve the task in [Task Description]. Strictly follow the [Action Options] and [Output Instruction].
Round 1 planner response.
EXPLAIN
To stack the lighter block on the heavier block, I will pick up cubeA and place it on top of cubeB.
EXECUTE
ACTION PICK cubeA
ACTION PLACE [0.17 −0.03 1.10 1 0 0 0] ACTION RESET

TABLE 3

Prompt example for Task Generation
You are serving as a task-generation helper for a given robot environment.
[General Environment Description] The environment is called "Block World". There is a 7DOF Franka Panda robot with a parallel gripper, it has a force sensor on the end effector. The robot is mounted on a table. There are multiple blocks on the table, here, we use 2 blocks as an example. The blocks are called cubeA and cubeB. The blocks are initialized at a random position on the table. The observation space (when there are two blocks) is a 26 dimension vector, consisting of:
cubeA position(3), cubeA orientation(4), cubeB position(3), cubeB orientation(4), end effector position(3), end effector orientation(4), end effector force(3), left finger position(1),
right finger position(1)
If there are more than two blocks, the observation space is a 26+7*(n-2) dimension vector, where n is the number of blocks.
[Extra Environment Assumption Tags]
<weight> The blocks have randomized weights.
<move> The blocks are randomly determined to be movable or not; at least one block is movable.
<three> There are three blocks in the environment.
[Your Task] Come up with 50 different tasks for the robot to perform. Each is designed under the assumption tags.
[Output format] The response should follow the template below: ### Task i: task tagtask description
where i is the task number and task description is the task description.
The rules for task description:
    Only include the objects in the environment in the task description.
    The task description doesn't need to include all the objects in the environment.
    The robot's basic skills are reach, grasp, and place. The task should not be out of its
capability.
4. The task description can be implicit in the objects. For example, Pick up the heavier block is a valid task description.
5. The task description can be implicit in the goal. For example, Maximize the height of the two blocks is a valid task description.
6. Use your imagination to come up with different tasks. The tasks should be diverse and not too similar to each other.
7. You can include tasks with different levels of difficulty. Eazy tasks have short action sequences. Harder tasks have longer horizons which requires reasoning in planning.
8. Some tasks are not solvable with the initial observation. There are uncertainties in the task that require the robot to explore the environment to gather information. For tasks you think satisfy this requirement, please add a * at the end of the task description.
9. At least 30% of the tasks should be non-solvable with the initial observation.
10. Tags can be combined together.
[Example] Examples of task tagtask description:
<move> find the movable cube and place it on top of the other block. *
<weight> move the heavier block to the corner of the table.*
<three><weight> sort all the blocks by their weight.*
<three> stack the three blocks

TABLE 4

Prompt example for CoT instruction generation
You will be given a task in a robotic environment. You are asked to simulate the task
instructions and corresponding responses happening during task solving. Some of them
are long-horizon tasks request multiple reasoning steps, so we are generating multi-turn
instructions in a chain of thought way. These task instructions will be given to a GPT
model and we will evaluate the GPT model performance on the generated responses.
[General Environment Description]
<ENVIRONMENT DESCRIPTION PLACEHOLDER>
[Extra Environment Assumption Tags]
<TAGS PLACEHOLDER>
Tags at the beginning of TASK represent the environment assumptions for the task.
In the default setting, blocks are movable and have the same weight.
[Instruction data Format]
The robot will be given a task: TASK. The instructions and responses happen when
the robot is trying to solve this specific TASK and asks a chatbot guide. Each
instruction data pair consists of three parts: instruction, input, output
The instruction consists of the question asked by the robot to help make decisions.
The input consists of the current observation and historical info.
The output consists of two parts <verbal> and <action>.
The <verbal> part describe the reasoning process and explanation for the current
planned action if there is any.
The <action> part include a downstream action provided in the function lists
executable by the robot.
The instruction of each task consists of the following standard questions in order to
provide chain of thought instructions pairs.
   Is the current information enough to solve the task? If not, what
   information is missing?
   What are the actions the robot should take to gather information?
   What are the actions the robot should take to solve the task?
For the 1st question, the <action> output part should be <nooutput>, only <verbal>
output is important. The robot should ask this every time it collects new information. For the
other questions, both <verbal> and <action> output parts are important. The 2nd and 3rd
question usually happens when the answer to previous round question 1 is no(for question 2)
or yes(for question 3).
When generating instruction data, you need to imagine the observation and previously
collected information for the robot when asking the question and generate the corresponding
input. The generated output should correspond to the input you created.
[Format of generated instructions]
   The i-th response need to satisfy the following format.
// start of instruction pair i, not including this line.

i.
<Task> task
<Instruction> instruction
<Input> input
<Output>
[verbal] verbal output
[action] list of function output
// end of instruction pair i, not including this line.
2. The index of instructions starts from 1.
3. The format of instruction: It's usually one of the questions listed above.
4. The format of input will be a vector of robot observation, followed by a list of historical
information. Use actual numbers in the vectors. The format is:
Current: [observation]
Past:
Round 1: [hist text 1] [hist action list 1] [hist obs list 1]
Round 2: [hist text 2] [hist action list 2] [hist obs list 2]
...
[hist text] [hist action list] are the previous rounds explanation and action sequence,
[hist obs list] is the observation after the action executions in previous rounds. The
number of hist obs should correspond to the number of actions in hist action list.
5. The format of verbal output will be a sentence explain the current reasoning
process and the current planned action.
6. The format of action output will be list of function name function parameter
wrapped by [ ].
Each element should be in a python executable form, don't use placeholders as
parameters, output the numbers if the parameters are vectors.
7. Each instruction pair should be separated by a line of "###" at the beginning.
8. Generate the multiple rounds of instructions from initial until the task is solved, the
observations in history should be consistent with the observations in the current round.
9. When the task is finished, start from the beginning and solve the tasks from different initial
states. Continue the index from the previous set of instructions. Repeat for at least 2 times.
10. There can be different responses to the same question depending on different input, when
there's multiple potential input output pairs, try to cover different cases during the
repeating.
[Tasks to solve]
Below is the TASK used in the generated instructions:
<TASK PLACEHOLDER>
[Function Lists in skill library]
<FUNCTION LIST PLACEHOLDER>

TABLE 4-continued

[Example observations]
Below are some example observations when executing some skills. Use them as a
reference for imagined observations when generating instructions.
<TRAJECTORY PLACEHOLDER>
[Example instruction pairs]
Below are some example instruction pairs. Use them as a reference when generating
instructions.
<INSTRUCTION EXAMPLE PLACEHOLDER>
Ignore the index in the example and start from 1.

FIG. 8 shows a system-level schematic of a control system (controller) where a robotic system 200 is controlled by an LLM controller 100 which consists of an LLM planner 202 and LLM evaluator 209. The controller 100 includes a sensor interface (not shown) configured to generate and transmit states and current observations acquired by sensors, an interface circuit (not shown) configured to receive the states and the current observations from the sensor interface and a task description provided by a user (operator) and a robot interface (not shown) configured to generate and transmit commands to operate the robot arm in response to the action sequence from the LLM planner. In some cases, the sensor interface, the interface circuit, and the robot interface may be integrated into a signal interface circuitry (signal interface circuit board). Further, the interface circuit may include a microphone and a speech recognition module to generate the task description from task words spoken by the user.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A controller for manipulating objects by a robot arm having a gripper, comprising:
a sensor interface configured to generate and transmit states and current observations acquired by sensors;
an interface circuit configured to receive the states and the current observations from the sensor interface and a task description provided by a user;
a large language model (LLM) planner configured to acquire the states and the task description and generate an action sequence command that operates the robot arm with the gripper based on the task description, the current observations, historical information including historical actions and historical observations from previous steps, wherein the LLM planner reasons about uncertainty of completion of the task due to incomplete information based on the current observations, wherein the LLM planner transmits the generated action sequence command to the robot arm;
a robot interface configured to generate and transmit commands to operate the robot arm in response to the action sequence from the LLM planner; and
an LLM evaluator configured to acquire the states, the current observations, analyze the historical information including historical actions and historical observations from previous steps, evaluate missing information required to complete the task, evaluate new information acquired by the sensors, estimate a task-execution status after the robot arm operated the generated action sequence, and output updated information to the LLM planner.

2. The controller of claim 1, wherein the states are an environment state obtained by observations of the sensors.

3. The controller of claim 1, wherein the sensors include force sensors, torque sensors, tactile sensors connected to actuators of the robot arm, and imaging sensors including depth cameras.

4. The controller of claim 1, wherein reasoning and chain-of-thought (CoT) capability of LLMs to plan and perform partially observable tasks while interacting with an environment.

5. The controller of claim 1, where the LLM evaluator is used to provide instructions regarding the missing information for the task being performed by the robot arm.

6. The controller of claim 1, wherein the LLM planner is used to plan actions for robot to collect the missing information using the sensors.

7. The controller of claim 1, where the LLM evaluator is used to evaluate the information collected by the robots from the sensor data and update the list of missing information.

8. The controller of claim 1, wherein the interface circuit includes a microphone and a speech recognition module to generate the task description from task words spoken by the user.

9. The controller of claim 1, wherein the action sequence command is generated by use of a robot action library.

10. The controller of claim 1, wherein the LLM planner and the LLM evaluator are configured to perform reasoning and chain-of-thought (CoT) to solve partially observable tasks.

11. The controller of claim 1, wherein a pre-trained LLM is used to generate in-context data to perform in-context fine-tuning a smaller LLM to perform chain-of-thought reasoning for partially observable robotic tasks.

12. The controller of claim 1, wherein the controller comprises a processor and storing the LLM planner and the LLM evaluator as processor-implemented programs performed by the processor.

13. A non-transitory computer-readable storage medium having stored thereon executable instructions that, as a result of being executed by one or more processors, cause a control system to perform steps of:
generating and transmitting states and current observations acquired by sensors;
receiving the states and the current observations from the sensors and a task description provided by a user;
acquiring, using a large language model (LLM) planner, the states and the task description and generate an action sequence command that operates the robot arm with the gripper based on the task description, the current observations, historical information including historical actions and historical observations from previous steps, wherein the LLM planner reasons about uncertainty of completion of the task description based on the current observations, wherein the LLM planner transmits the generated action sequence command to the robot arm;
a robot interface configured to generate and transmit commands to operate the robot arm in response to the action sequence from the LLM planner; and
acquiring, using an LLM evaluator, the states, the current observations, analyze the historical information, evaluate missing information for the task description, evaluate new information acquired by the sensors, estimate a task-execution status after the robot arm operated the generated action sequence, and output updated information to the LLM planner.

14. The non-transitory computer-readable storage medium of claim 13, wherein the states are an environment state obtained by observations of the sensors.

15. The non-transitory computer-readable storage medium of claim 13, wherein the sensors include force sensors, torque sensors connected to actuators of the robot arm, and imaging sensors including depth cameras.

16. The non-transitory computer-readable storage medium of claim 13, wherein reasoning and chain-of-thought (CoT) capability of LLMs to plan and perform partially observable tasks while interacting with an environment.

17. The non-transitory computer-readable storage medium of claim 13, where the LLM evaluator is used to provide instructions regarding the missing information for the task being performed by the robot arm.

18. The non-transitory computer-readable storage medium of claim 13, wherein the LLM planner is used to plan actions for robot to collect the missing information using the sensors.

19. The non-transitory computer-readable storage medium of claim 13, where the LLM evaluator is used to evaluate the information collected by the robots.

20. The non-transitory computer-readable storage medium of claim 13, wherein the interface circuit includes a microphone and a speech recognition module to generate the task description from task words spoken by the user.

* * * * *